ized Patent

(12) United States Patent
Pesik et al.

(10) Patent No.: US 10,249,203 B2
(45) Date of Patent: Apr. 2, 2019

(54) METHOD AND SYSTEM FOR PROVIDING DOCKING GUIDANCE TO A PILOT OF A TAXIING AIRCRAFT

(71) Applicant: Rosemount Aerospace Inc., Burnsville, MN (US)

(72) Inventors: Joseph T. Pesik, Eagan, MN (US);
Todd Anthony Ell, Savage, MN (US);
Robert Rutkiewicz, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 73 days.

(21) Appl. No.: 15/489,369

(22) Filed: Apr. 17, 2017

(65) Prior Publication Data

US 2018/0301045 A1    Oct. 18, 2018

(51) Int. Cl.
*G06K 9/00* (2006.01)
*G08G 5/06* (2006.01)
(Continued)

(52) U.S. Cl.
CPC ............ *G08G 5/065* (2013.01); *B64D 47/08* (2013.01); *B64F 1/002* (2013.01); *G06K 9/00812* (2013.01); *G06K 9/2018* (2013.01); *G06K 9/2036* (2013.01); *G06T 7/13* (2017.01); *G06T 7/73* (2017.01); *G08G 5/0021* (2013.01); *G08G 5/045* (2013.01); *H04N 5/33* (2013.01); *H04N 7/183* (2013.01); *G06K 2009/3225* (2013.01);
(Continued)

(58) Field of Classification Search
USPC ......................................................... 382/104
See application file for complete search history.

(56) References Cited

U.S. PATENT DOCUMENTS

| 5,166,746 A | 11/1992 | Sato et al. |
| 8,958,942 B2 | 2/2015 | Kolcarek et al. |
| (Continued) | | |

FOREIGN PATENT DOCUMENTS

| EP | 1873013 A1 | 1/2008 |
| EP | 2669706 A2 | 12/2013 |
| (Continued) | | |

OTHER PUBLICATIONS

Extended European Search Report for EP Application No. 18167063. 9, dated Sep. 14, 2018, 5 pages.

*Primary Examiner* — Jerome Grant, II
(74) *Attorney, Agent, or Firm* — Kinney & Lange, P.A.

(57) ABSTRACT

Apparatus and associated methods relate to using an image of a fiducial located indicating a parking location for the aircraft to provide docking guidance data to a pilot of an aircraft. The fiducial has vertically-separated indicia and laterally-separated indicia. A camera is configured to mount at a camera location so as to be able to capture two-dimensional images of a scene external to the aircraft. The two-dimensional image includes pixel data generated by the two-dimensional array of light-sensitive pixels. A digital processor identifies first and second sets of pixel coordinates corresponding to the two vertically-separated and the two laterally-separated indicia, respectively. The digital processor then calculates, based at least in part on the identified first pixel coordinates corresponding to the two vertically-separated indicia, a range to the parking location.

20 Claims, 6 Drawing Sheets

(51) Int. Cl.
    *G06T 7/73*     (2017.01)
    *H04N 5/33*     (2006.01)
    *H04N 7/18*     (2006.01)
    *G06T 7/13*     (2017.01)
    *B64D 47/08*     (2006.01)
    *G08G 5/04*     (2006.01)
    *B64F 1/00*     (2006.01)
    *G06K 9/20*     (2006.01)
    *G08G 5/00*     (2006.01)
    *G06K 9/32*     (2006.01)

(52) U.S. Cl.
    CPC .............. *G06T 2207/10016* (2013.01); *G06T 2207/10048* (2013.01); *G06T 2207/30204* (2013.01); *G06T 2207/30264* (2013.01)

(56) References Cited

U.S. PATENT DOCUMENTS

| | | | |
|---|---|---|---|
| 9,207,679 B1 | 12/2015 | Chatham | |
| 9,460,557 B1* | 10/2016 | Tran | B29C 64/386 |
| 2013/0182906 A1* | 7/2013 | Kojo | G01S 11/12 |
| | | | 382/103 |
| 2015/0012244 A1* | 1/2015 | Oki | G01S 17/32 |
| | | | 702/159 |
| 2015/0329217 A1 | 11/2015 | Kirk et al. | |
| 2016/0154475 A1* | 6/2016 | Eriksson | G06F 3/017 |
| | | | 345/156 |
| 2016/0217562 A1* | 7/2016 | Ulman | G06T 7/0002 |
| 2017/0169641 A1* | 6/2017 | Ziegler | B60R 25/24 |
| 2017/0301250 A1 | 10/2017 | Ell et al. | |
| 2017/0334578 A1* | 11/2017 | Fleck | B64D 47/08 |
| 2018/0139431 A1* | 5/2018 | Simek | H04N 5/2258 |
| 2018/0200745 A1* | 7/2018 | Dudar | B05B 12/004 |

FOREIGN PATENT DOCUMENTS

| | | |
|---|---|---|
| FR | 2795045 A1 | 12/2000 |
| WO | 9609207 | 3/1996 |
| WO | WO03072435 A1 | 9/2003 |

\* cited by examiner

METHOD AND SYSTEM FOR PROVIDING DOCKING GUIDANCE TO A PILOT OF A TAXIING AIRCRAFT

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft optical guidance docking system would be useful to help a pilot align the aircraft with a parking location at a gate passenger boarding bridge, and to survey the area forward of the tail, wingtips and/or engines, to detect obstructions in a potential collision path, and to provide visual and audible alerts to the cockpit.

SUMMARY

Apparatus and associated devices relate to providing guidance to a pilot of a taxiing aircraft. The provided guidance includes providing alignment metrics indicative of an alignment of the taxiing aircraft to a parking location identified by an alignment fiducial. In some embodiments the provided guidance includes obstacle metrics indicative of range and/or location of obstacles within a path of the taxiing aircraft. An optical docking guidance system includes a camera and a digital processor. The camera is configured to mount at a camera location on an aircraft so as to generate a two-dimensional image of a scene external to the taxiing aircraft. The scene is aligned with an optical axis of the camera. The two-dimensional image includes optical intensity data for each of a two-dimensional array of pixels. Each pixel has a pixel coordinate representing a location of the pixel within the two-dimensional array. The digital processor is configured to identify first and second sets of pixel coordinates within the image of the scene external to the aircraft. The identified first and second sets of pixel coordinates corresponding to two vertically-separated and two laterally-separated indicia, respectively, of an alignment fiducial indicating the parking location for the taxiing aircraft. The digital processor is further configured to calculate, based at least in part on the identified first pixel coordinates corresponding to the two vertically-separated indicia, a range to the parking location.

DETAILED DESCRIPTION

Apparatus and associated methods relate to using an image of a fiducial indicating a parking location for the aircraft to provide docking guidance data to a pilot of an aircraft. The fiducial has vertically-separated indicia and laterally-separated indicia. A camera is configured for mounting at a camera location so as to be able to capture two-dimensional images of a scene external to the aircraft. The two-dimensional image includes pixel data generated by the two-dimensional array of light-sensitive pixels. A digital processor identifies first and second sets of pixel coordinates corresponding to the two vertically-separated and the two laterally-separated indicia, respectively. The digital processor then calculates, based at least in part on the identified first pixel coordinates corresponding to the two vertically-separated indicia, a range to the parking location.

Figure 1:
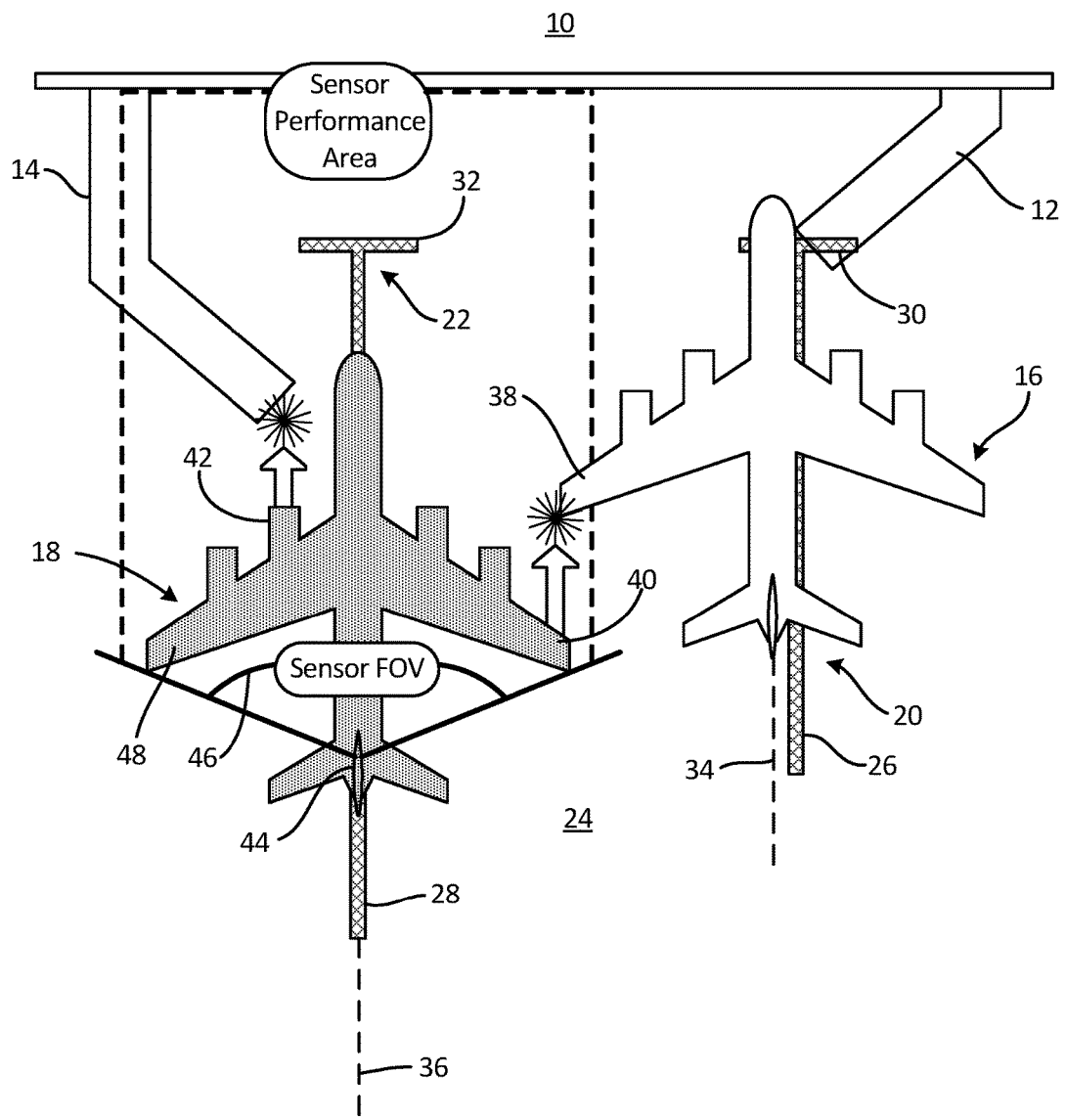
FIG. 1 is a schematic view of an airport with two aircraft parked at gate locations.

FIG. 1 is a schematic view of an airport with two aircraft at gate locations. In FIG. 1, airport concourse 10 includes gate passenger boarding bridges 12 and 14 for parked aircraft 16 and taxiing aircraft 18, respectively. Aircraft stand position markers 20 and 22 are painted on tarmac 24 so as to provide visual alignment indicators to the pilots taxiing aircrafts 16 and 18 to gate passenger boarding bridges 12 and 14, respectively. Aircraft stand position markers 20 and 22 each includes two portions: i) stand lead-in lines 26 and 28; and ii) stop lines 30 and 32, respectively. Each of stand lead-in lines 26 and 28 provides a visible line of direction for aircrafts 16 and 18 to follow while taxiing to gate passenger boarding bridges 12 and 14, respectively. Each of stop lines 30 and 32 provides a visible indicator of a desired location of forward landing gear when aircraft 16 and 18 are parked at gate passenger boarding bridges 12 and 14, respectively.

Aircraft 16 is parked at gate passenger boarding bridge 12, which has been positioned to provide a walkway for passengers embarking and/or disembarking aircraft 16. Aircraft 16 has been parked at gate passenger boarding bridge 12 in such a way that aircraft 16 is misaligned with aircraft stand position marker 20. Aircraft 16 is parked such that longitudinal axis 34 of aircraft 16 is to the left of stand lead-in line 26. Because aircraft 16 is parked to the left of stand lead-in line 26, aircraft 16 is encroaching upon the space reserved proximate gate passenger boarding bridge 14 toward which aircraft 18 is taxiing. Although longitudinal axis 36 of taxiing aircraft 18 is aligned with stand lead-in line 28, taxiing aircraft 18 encounters two collision hazards as aircraft 18 taxis toward gate passenger boarding bridge 14. First, wingtip 38 of aircraft 16 is obstructing wingtip 40 of taxiing aircraft 18. Second, gate passenger boarding bridge 14 is positioned so as to obstruct nacelle 42 of taxiing aircraft 18.

Taxiing aircraft 18 is equipped with a camera located on vertical stabilizer 44 for providing optical docking guidance. The camera located on vertical stabilizer 44 has an optical axis aligned with longitudinal axis 36 of aircraft 18. The camera located on vertical stabilizer 44 has field of view 46 as indicated in the figure. The camera located on vertical stabilizer 44 is part of an optical docking guidance system. In some embodiments, the optical docking guidance system can be used to assist the pilot in aligning the aircraft with the intended parking location indicated by aircraft stand position markers 22. In some embodiments, the optical docking guidance system can also be used to detect potential collisions and to provide an alert signal to the pilot when a risk of collision exceeds a predetermined risk threshold.

In some embodiments, an optical docking guidance system can also provide a collision alert capability. For example, the optical docking guidance system of taxiing aircraft 18 includes a light projector mounted at a projector location on the left wing 48 of taxiing aircraft 18. The light projector is configured to project a structured image onto a scene external to taxiing aircraft 18, thereby illuminating objects nearby and external to taxiing aircraft 18. The light projector and/or camera can be mounted at various locations on taxiing aircraft 18. Some examples of such collision alerting capabilities are disclosed by Ell et al. in U.S. patent application Ser. No. 15/385,224, filed Dec. 20, 2016, titled "Method and System for Aircraft Taxi Strike Alerting," the entire disclosure of which is hereby incorporated by reference.

The structured image that is projected by the light projector has features that can be identified in images formed by the camera mounted at the camera location on vertical stabilizer 44. Location(s) and range(s) of object(s) imaged by the camera can be calculated using triangulation. Such calculations are based on the projector location, the camera location, and the location within the generated image (e.g., pixel coordinates) where the structured light reflected by objects in the scene. For example, the light projector can be located at a projector location on taxiing aircraft 18 that is different from a camera location where the camera is located. The pixel coordinates corresponding to the structured-light portions of the generated image can be used to determine a location(s) and a range(s) of object(s) from which that structured light is reflected.

The light projector, for example, can project a structured image that includes a pattern of lines projecting at various angles of elevation from the light projector. One line might be projected at an angle of elevation of zero degrees (i.e., directed parallel to the horizon). A second line might be projected at an angle of negative five degrees from the horizon (i.e., directed at a slightly downward angle from the light projector). Each of these projected lines of light, when reflected from an object, will be imaged at different regions (e.g., each will have a different vertical pixel coordinate) within the camera image, depending on the range distance between the reflecting object and taxiing aircraft 18. Knowing the projector location of the light projector, the camera location of the camera, the specific feature of the structured image (e.g., which horizontal line is imaged), and the pixel coordinates within the generated image corresponding to the specific feature can permit a determination of the location(s) and/or range(s) of the object(s) from which the specific feature has been reflected.

The light projector projects the spatially-patterned light over a solid angle of illumination. The projected spatially-patterned light illuminates objects that reside within the solid angle of illumination. In the depicted embodiment, the light projector has an optical axis that is coplanar with longitudinal axis 36 of taxiing aircraft 18. The light projector illuminates objects that are within an azimuthal range of +/−85 degrees, for example, of longitudinal axis 36 of taxiing aircraft 18, and within an elevation range of a projection horizon of the light projector. The elevation range of projection, for example, can be from about +3, +5, +10, +12, or +15 degrees to about −2, −5, −8, or −10 degrees of projection from a vertical location of the light projector, sufficient to encompass the wingtips of both left and right wings, as well as a plane extending forward of these wingtips parallel to longitudinal axis 36 of taxiing aircraft 18.

The spatially patterned light can have a wavelength corresponding to infrared light and/or to an atmospheric absorption band. Using infrared light can minimize a distraction to a pilot who is taxiing the aircraft. Using infrared light that is of lower solar intensity can permit low-power projector illumination, as the illuminating power need not compete with the sun's illumination in some spectral bands. Projectors using IR spectrum that has solar illumination absorbed by the atmosphere can further reduce the required illumination. Knowing a first aircraft location from where the light is projected, a second aircraft location where the reflection is imaged, and a location within the image corresponding to a feature of the spatially patterned light permits a calculation of the location and range of the illuminated object.

Using the calculated location information, pilots taxiing aircraft 18 can be informed of any potential collision hazards within the scene illuminated by the light projector. Pilots of taxiing aircraft 18 can cease forward progress of aircraft 18 or steer aircraft 18 to avoid wingtip collisions and/or engine nacelle collisions based on the location(s) and range(s) of object(s) (e.g., passenger boarding bridge gate 14 and wingtip 38 of parked aircraft 16) that is calculated by such an aircraft collision alerting system.

Figure 2:
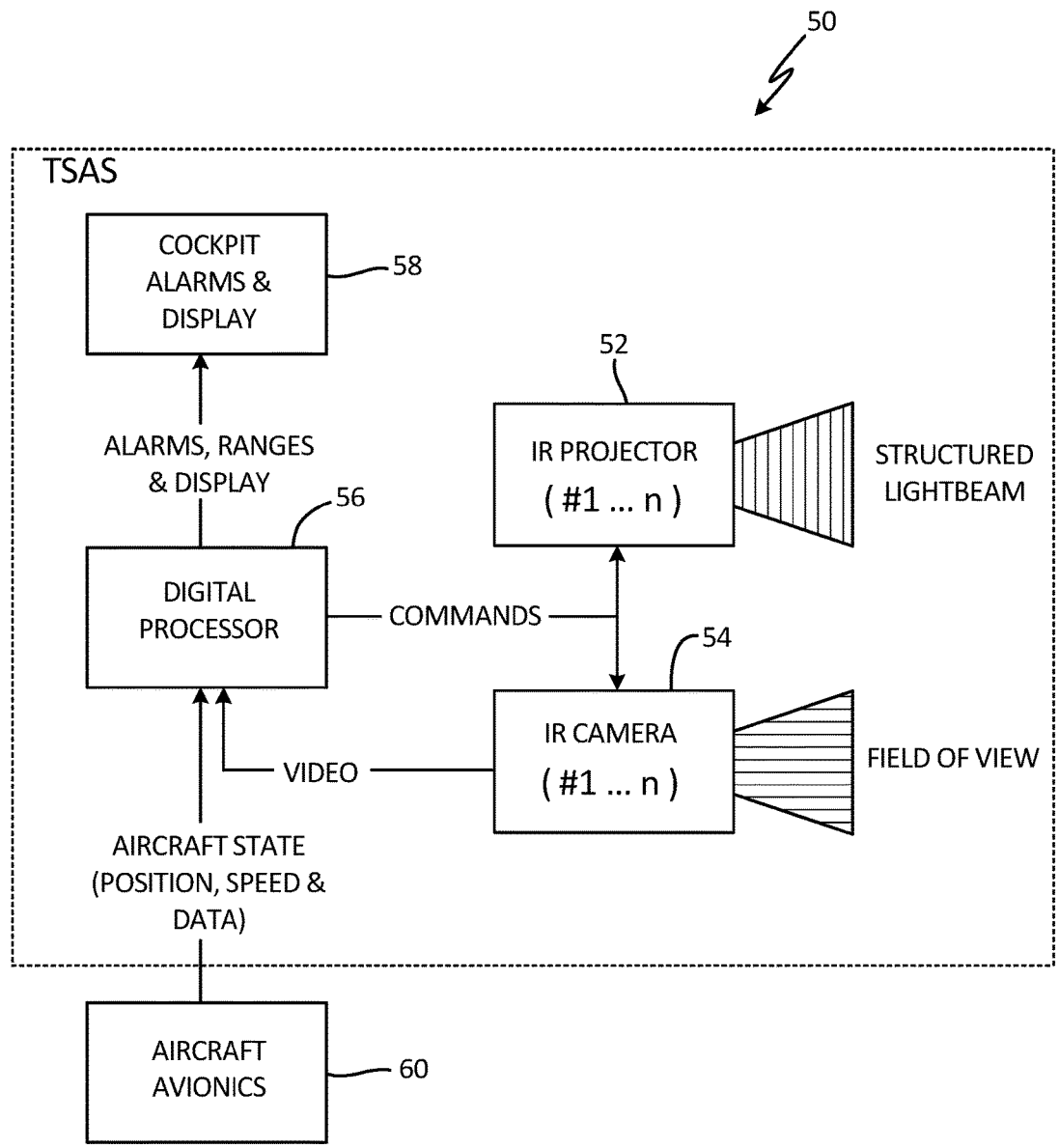
FIG. 2 is a block diagram of an exemplary aircraft collision alerting system.

FIG. 2 is a block diagram of an exemplary optical docking guidance system. Optical docking guidance system 50 includes infrared projector(s) 52, camera(s) 54, digital processor 56, and cockpit alarm and display module 58. Infrared projector(s) 52 is configured to be mounted at a projector location(s) on an aircraft. Infrared projector(s) 52 is further configured to project spatially-patterned light from infrared projector(s) 52 onto a scene external to the aircraft, thereby illuminating a spatially-patterned portion of the scene.

Camera(s) 54 is configured to be mounted at one or more camera locations on the aircraft. Camera(s) 54 is further configured to receive light reflected from the scene. Camera(s) 54 is further configured to focus the received light onto a focal plane array comprising a plurality of light-sensitive pixels, thereby forming an image of the scene. The image can include pixel data generated by the plurality of light-sensitive pixels.

Digital processor 56 receives inputs from camera(s) 54 and from aircraft avionics 60. Digital processor 56 generates commands that control the operation of infrared projector(s) 52 and camera(s) 54. Digital processor 56 outputs alarms ranges and images to cockpit alarms and display module 58. Digital processor 56 is configured to identify pixel coordinates corresponding to a subset of the plurality of light-sensitive pixels upon which the spatially-patterned light projected by infrared projector(s) 52 and reflected from the spatially-patterned portion of the scene is focused. Digital processor 56 is further configured to use triangulation, based on the projector location of infrared projector(s) 52, the location(s) of camera(s) 54 and the identified pixel coordinates, to calculate range value data of object(s) in the scene from which the spatially-patterned light projected by infrared projector(s) 52 is reflected. Digital processor 56 can be configured to execute as an image processor.

Figure 3:
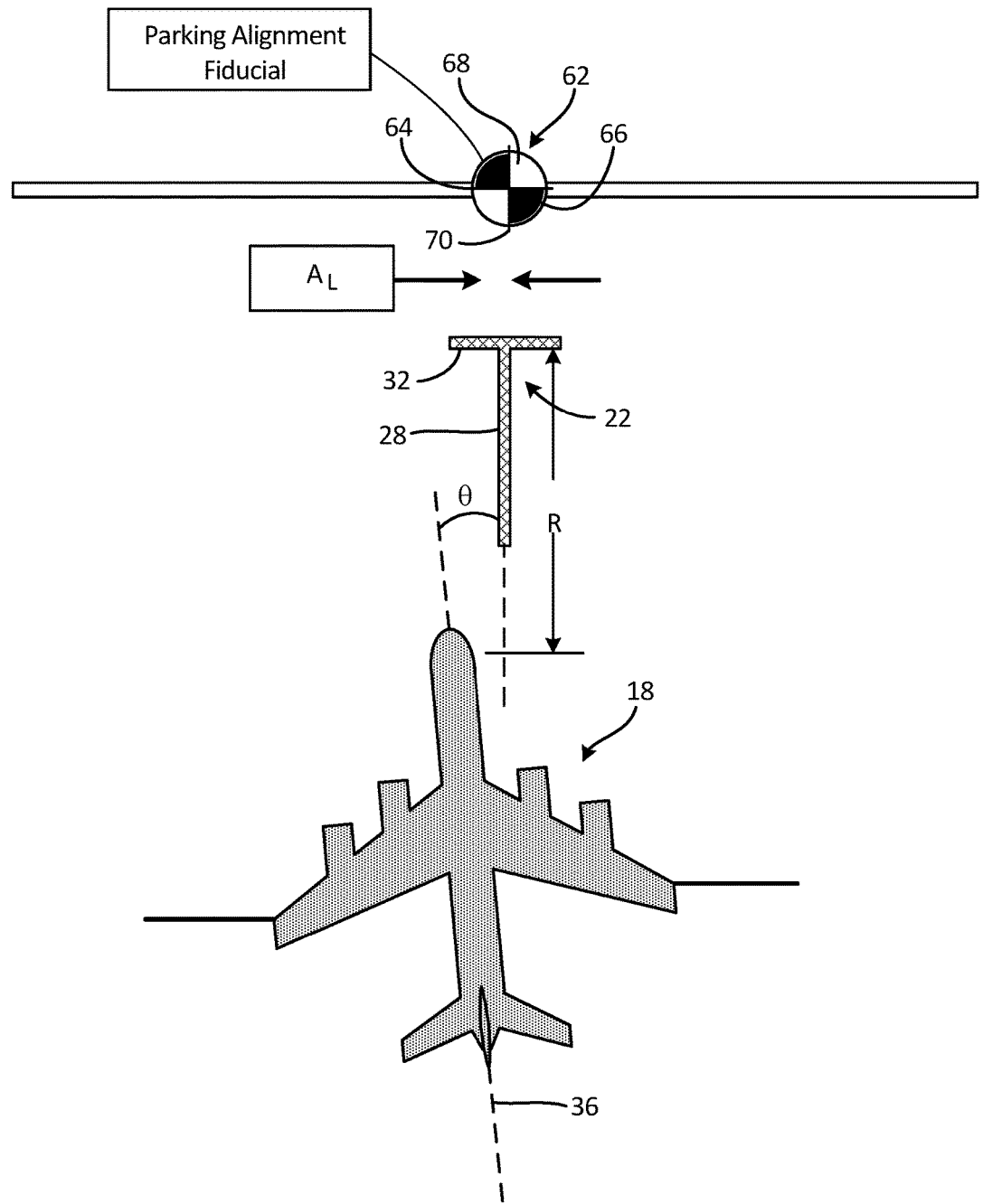
FIG. 3 is a schematic view of an aircraft using an exemplary optical docking guidance system to align the aircraft with stand position marking.

FIG. 3 is a schematic view of an aircraft using an exemplary optical docking guidance system to align the aircraft with stand position marking. In FIG. 3, taxiing aircraft 18 is approaching a parking location indicated by aircraft stand position marker 22. Aircraft 18 is equipped with an optical docking guidance system. The optical docking guidance system uses alignment fiducial 62 to provide a visual indication of the parking location. Alignment fiducial 62 is laterally aligned along stand lead-in line 28, thereby providing a visual indicator of the parking location.

Alignment fiducial 62 has at least two vertically-separated indicia and at least two laterally-separated indicia. In the depicted embodiment, alignment fiducial 62 includes a circle that has four quadrants. Alternating quadrants of the circle are alternately shaded. Various features of alignment fiducial 62 can be used as laterally-separated and/or vertically-separated indicia. For example, laterally-separated indicia 64 and 66 are located on the lateral sides of the circle where the top and bottom quadrants abut one another. Vertically-separated indicia 68 and 70 are located on the vertical sides of the circle where the left and right quadrants abut one another.

When alignment fiducial 62 is in the field of view of camera(s) 54 of optical docking guidance system 50, the generated image will include image features depicting alignment fiducial 62. The portion of the generated image corresponding to alignment fiducial 62 contains information regarding the relative alignment of taxiing aircraft 18 with the parking location indicated by aircraft stand position marker 22. For example, as taxiing aircraft 18 approaches alignment fiducial 62, the portion of the generated image corresponding to alignment fiducial 62 increases in size. Also, if longitudinal axis 36 of taxiing aircraft 18 is parallel to but laterally translated from stand lead-in line 28, the portion of the generated image corresponding to alignment fiducial 62 will be translated from a centerline of the generated image. If, however, longitudinal axis 38 of taxiing aircraft 18 is at an angle θ with respect to stand lead-in line 28, then the portion of the generated image corresponding to alignment fiducial 62 will be distorted (e.g., the lateral pixel dimension of the circle will differ from the vertical pixel dimension of the circle). Thus, the pixel coordinates corresponding to the vertically-separated 68 and 70 and laterally-separated 64 and 66 indicia can be used to calculate a range R, a lateral translation $A_L$ and an alignment angle θ characterizing the alignment of taxiing aircraft 18 to the parking location indicated by aircraft stand position marker 22.

In some embodiments, alignment fiducial 62 is a standard size and is configured to be located at a standard distance from stop line 32. In some embodiments, alignment fiducial 62 can be sized so that when located at whatever distance it is located from stop line 32, alignment fiducial 62 will be imaged at a standard image size by camera(s) 54.

Infrared projector(s) 52 can generate a light pattern, akin to a fiducial pattern, on surfaces of airport concourse 10 to estimate distance and/or angle, when alignment fiducial 62 is not available or present. There are restrictions in the locations of light projector 52 and camera 54 on taxiing aircraft 18 so as to permit measurement of distance and/or angle of taxiing aircraft 18 with respect to the parking location. There are limitations, however, in what the system can compute using only a projected fiducial. A digital processor might not be able to determine the offset from the centerline without the alignment fiducial 62 or some other additional data for the location of the centerline.

Figure 4:
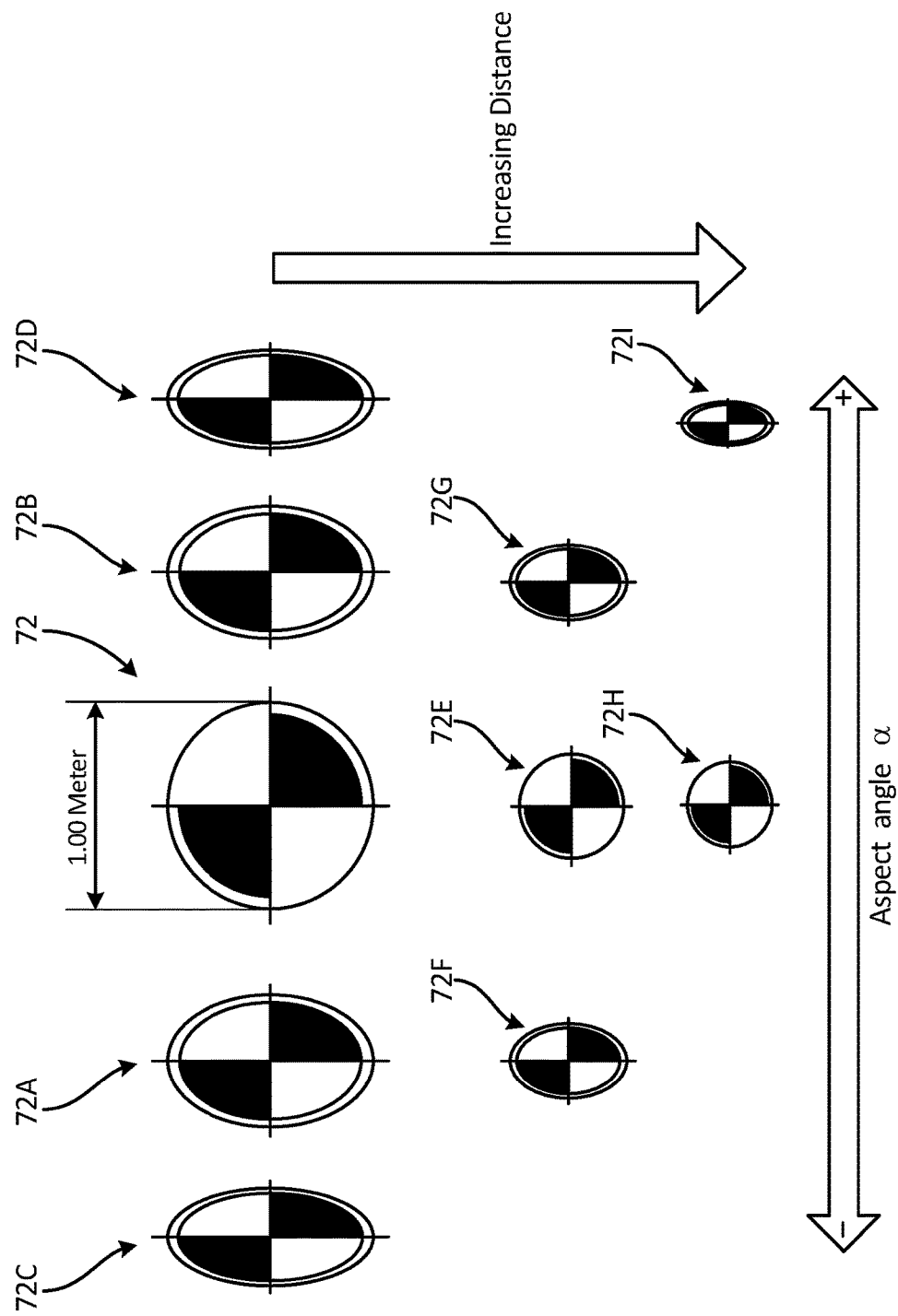
FIG. 4 is an exemplary fiducial as imaged by a camera from an aircraft at various alignments and positions relative to the fiducial.

FIG. 4 is an exemplary fiducial as imaged by a camera from an aircraft at various alignments and positions relative to the fiducial. In FIG. 4. Images 72 and 72A-I are various images of alignment fiducial 62 generated by camera(s) 54 attached to taxiing aircraft 18 at various alignment configurations with respect to alignment fiducial 62. Image 72 represents the image generated by camera(s) 54 when aircraft 18 is perfectly aligned with the parking position indicated by aircraft stand position marker 22. Images 72A-D represent the images generated by camera(s) 54 when aircraft 18 is at the proper distance from alignment fiducial 62, but longitudinal axis 36 of aircraft 18 is not parallel to aircraft stand position marker 22.

Images 72A and 72C are generated by camera(s) 54 when longitudinal axis 36 of aircraft 18 has an alignment angle θ that is less than 0°. Images 72B and 72E are generated by camera(s) 54 when longitudinal axis 36 of aircraft 18 has an alignment angle θ that is greater than 0°. Images 72A and 72B correspond to alignment scenarios in which a magnitude of the alignment angle θ is smaller than alignment scenarios corresponding to images 72C and 72D. In other words, images 72A and 72B are indicative of a rotational misalignment, which is not as grievous as the rotational misalignment indicated by images 72C and 72D.

The pixel coordinates corresponding to the vertically-separated 68 and 70 and laterally-separated 64 and 66 indicia can be used to calculate the angle between longitudinal axis 36 of aircraft 18 and stand lead-in line 28. For example, a difference between the pixel coordinates corresponding to the laterally-separated indicia 64 and 66 can provide a lateral measure of the imaged separation of the laterally-separated indicia 64 and 66. A difference between the pixel coordinates corresponding to the vertically-separated indicia 68 and 70 can provide a vertical measure of the imaged separation of the vertically-separated indicia 68 and 70. A ratio of the lateral measure to the vertical measure is indicative of the alignment angle θ of longitudinal axis 36 of taxiing aircraft 18 with respect to stand lead-in line 28.

Images 72E-72I are generated by camera(s) 54 when taxiing aircraft 18 is approaching but has not yet reached the parking location indicated by aircraft stand position marker 22. In images 72E-72I, the sizes of the images are smaller than the size of target image 72. Images 72E-G correspond to alignment scenarios in which the range R of taxiing aircraft 18 is greater than zero (e.g., taxiing aircraft 18 has not yet reached the parking location indicated by stop line 32). Also, images 72H and 72I correspond to alignment scenarios in which the range R of taxiing aircraft 18 is greater than the range of taxiing aircraft 18 when capturing images 72E-G.

The pixel coordinates corresponding to the vertically-separated indicia 68 and 70 can be used to calculate the range of aircraft 18 and the parking location indicated by aircraft stand position marker 22. For example, a difference between the pixel coordinates corresponding to the vertically-separated indicia 68 and 70 can provide a vertical measure of the imaged separation of the vertically-separated indicia 68 and 70. A ratio of the vertical measure to a predetermined standard vertical measure is indicative of the range R aircraft 18 and the parking location indicated by aircraft stand position marker 22.

The lateral translation of longitudinal axis 36 of aircraft 18 with respect to aircraft stand position marker 28 can also be calculated using pixel coordinates. If longitudinal axis 36 of aircraft 18 is parallel to but laterally translated from stand lead-in line 28, then a difference between the pixel coordinates corresponding to vertically-separated indicia 68 and 70, and a coordinates of a vertical center line of the generated image is indicative of lateral translation $A_L$. If longitudinal axis 36 of aircraft 18 is both translated and not parallel to stand lead-in line 28, then a combination of the lateral translation and alignment angle can be calculated using various image translation algorithms (e.g., affine scale-invariant feature translation).

Figure 5:
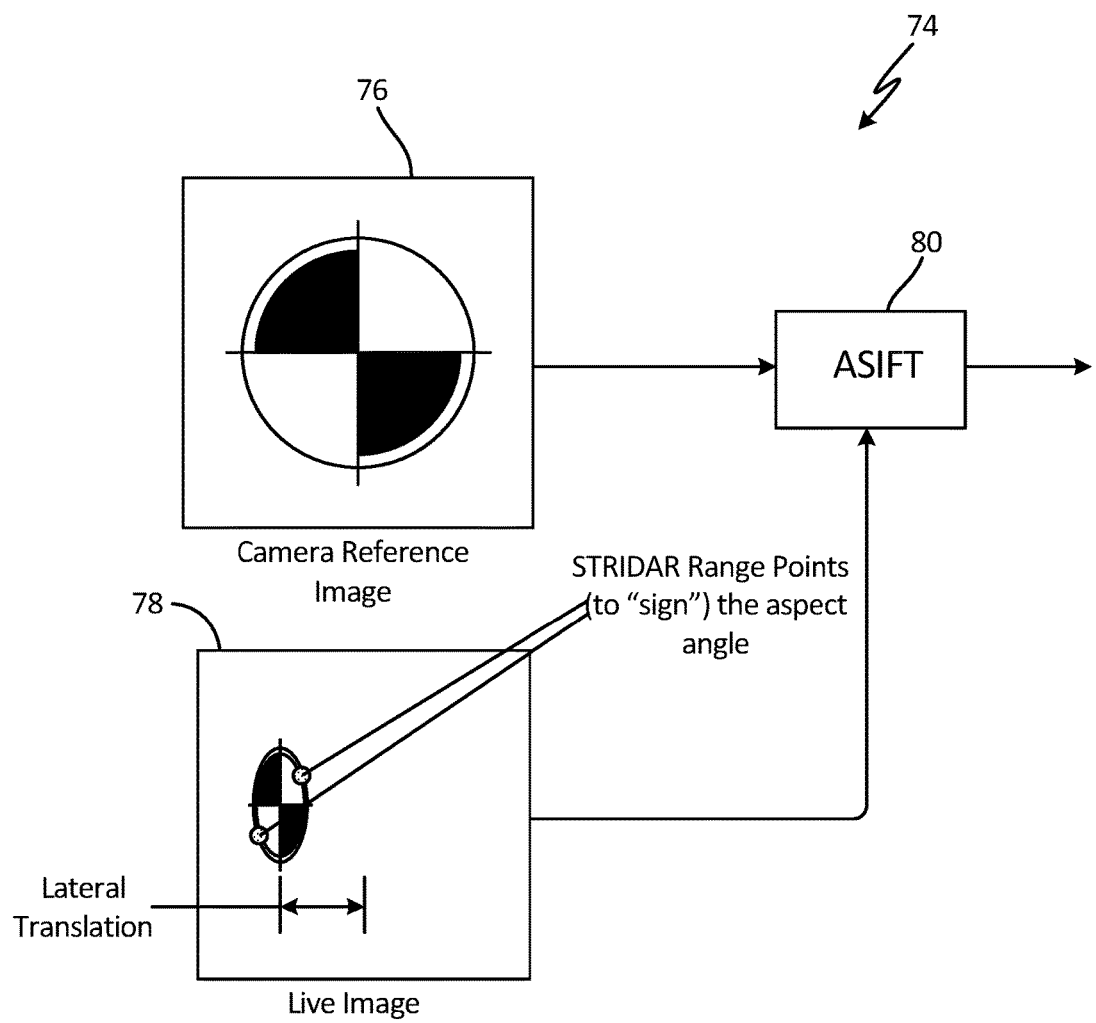
FIG. 5 is a block diagram of method for calculating alignment metrics for use in optical guidance of aircraft docking.

FIG. 5 is a block diagram of method for calculating alignment metrics for use in optical guidance of aircraft docking. In FIG. 5, alignment metric calculation method 74 includes predetermined reference image 76, live image 78 captured by camera(s) 54 and image processor 80. Image processor 80 receives both predetermined reference image 76 and live image 78 as inputs. In some embodiments, image processor identifies portions of live image 78 corresponding to alignment fiducial 62. Image processor may then determine pixel locations for vertically-separated 68 and 70 and/or laterally-separated 64 and 66 indicia of alignment fiducial 62. Image processor 80 may then calculate, based on the determined pixel coordinates, alignment metrics (e.g., range R and/or alignment angle θ, and/or translation $A_L$). Image processor 80 can use one or more of various algorithms to compute the desired output data. For example, one such algorithm is the affine scale-invariant feature translation algorithm. In some embodiments, the above disclosed image processing functions can be performed by image processor 80 and/or by digital processor 56.

Figure 6:
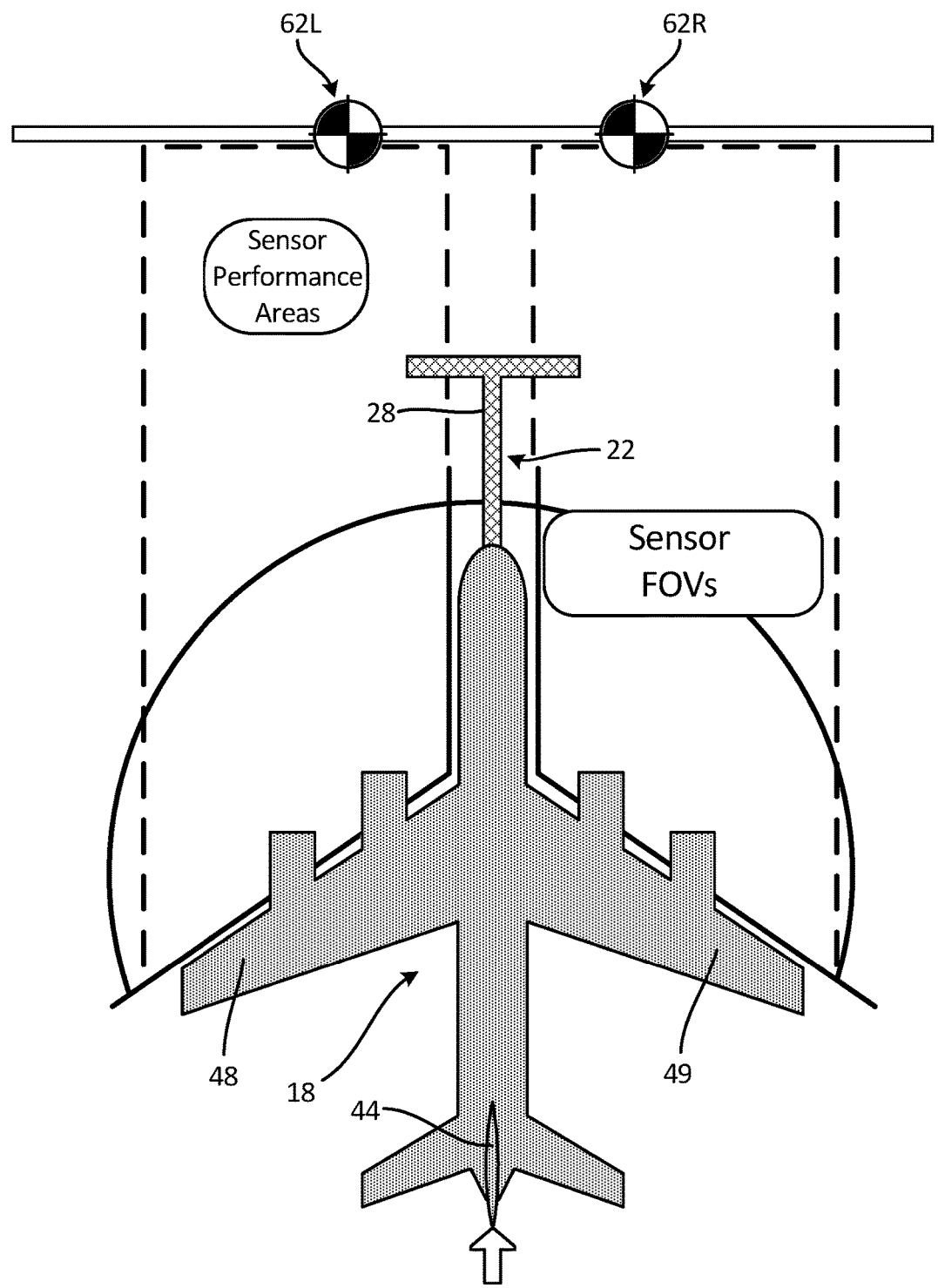
FIG. 6 is a schematic view of an aircraft using an exemplary optical docking guidance system having two fiducials.

FIG. 6 is a schematic view of an aircraft using an exemplary optical docking guidance system having two fiducials. In FIG. 6, taxiing aircraft 18 is approaching a parking location indicated by aircraft stand position marker 22. Aircraft 18 is equipped with an optical docking guidance system. In this embodiment, the optical docking guidance system uses two alignment fiducials 62L and 62R to provide visual indication of the parking location indicated by aircraft stand position marker 22. Alignment fiducials 62L and 62R are laterally aligned apart from one another. Alignment fiducials 62L and 62R are laterally spaced equidistant, for example, from stand lead-in line 28, thereby providing a visual indication of the parking location.

The optical docking guidance system used in conjunction with two alignment fiducials, such as is depicted in FIG. 6, may have two cameras 54, mounted at camera locations on each of wings 48 and 49. In some embodiments, image projector 52 is located at a projector location on vertical stabilizer 44. Alignment fiducial 62R is configured to be located within a field of view of the one of camera(s) 54 mounted on right aircraft wing 49. Alignment fiducial 62L is configured to be located within a field of view of the other one of cameras 54 mounted on left aircraft wing 48.

The following are non-exclusive descriptions of possible embodiments of the present invention.

Apparatus and associated methods relate to a system for providing docking guidance to a pilot of a taxiing aircraft. The system includes a camera configured to be mounted at a camera location on the taxiing aircraft. The camera is configured to generate a two-dimensional image of a scene external to the taxiing aircraft. The generated two-dimensional image includes pixel data generated by the two-dimensional array of light-sensitive pixels. The system includes a digital processor configured to identify first and second sets of pixel coordinates within the generated two-dimensional image of the scene external to the taxiing aircraft. The identified first and second sets of pixel coordinates correspond to two vertically-separated and two laterally-separated indicia, respectively, of an alignment fiducial indicating a parking location for the taxiing aircraft. The digital processor is further configured to calculate, based at least in part on the identified first pixel coordinates corresponding to the two vertically-separated indicia, a range to the parking location indicated by the alignment fiducial.

The system of the preceding paragraph can optionally include, additionally and/or alternatively, any one or more of the following features, configurations and/or additional components:

A further embodiment of the foregoing system can further include a cockpit notification system configured to provide a visual display of the generated image of the scene aligned with the optical axis of the camera. The provided visual display can be annotated with the calculated range to the parking location.

A further embodiment of any of the foregoing systems, wherein the digital processor can be further configured to calculate, based at least in part on the identified second pixel coordinates corresponding to the two laterally-separated indicia, an angle of the taxiing aircraft with respect to a normal vector of the alignment fiducial.

A further embodiment of any of the foregoing systems, wherein the digital processor can be further configured to calculate, based at least in part on the identified second pixel coordinates corresponding to the two laterally-separated indicia, a lateral translation of the longitudinal axis of the taxiing aircraft with respect to the parking location identified by the alignment fiducial.

A further embodiment of any of the foregoing systems can further include a light projector configured to be mounted at a projector location on the taxiing aircraft and to project spatially-patterned light from the light projector onto the scene external to the taxiing aircraft, thereby providing illumination of a spatially-patterned portion of the scene external to the taxiing aircraft. The digital processor can be further configured to identify a third set of pixel coordinates within the image of the scene external to the taxiing aircraft. The identified third set of pixel coordinates corresponds to the spatially-patterned portion of the scene. The digital processor can be further configured to use triangulation, based on the projector location of the light projector, the camera location of the camera and the identified third set of pixel coordinates, to calculate location(s) and/or range(s) of object(s) in the scene external to the taxiing aircraft from which the spatially-patterned light projected by the light projector is reflected.

A further embodiment of any of the foregoing systems, wherein the spatially-patterned light projected by the light projector can include infrared light.

A further embodiment of any of the foregoing systems, wherein the camera is an infrared camera and the light-sensitive pixels are sensitive to infrared light.

A further embodiment of any of the foregoing systems can further include a cockpit notification system configured to generate a visual display of the image aligned with the optical axis of the camera annotated with the calculated location(s) and/or range(s) of object(s) in the scene external to the taxiing aircraft.

A further embodiment of any of the foregoing systems, wherein the cockpit notification system can include an audible alarm that is activated when the calculated location(s) and/or range(s) indicate one or more of the object(s) in the scene has a combination of an location(s) and/or range(s) corresponding to a risk of collision relative to the taxiing aircraft.

A further embodiment of any of the foregoing systems, wherein the digital processor can be further configured to determine pixel boundaries of the object(s) in the scene.

A further embodiment of any of the foregoing systems, wherein the digital processor can be further configured to identify a fourth set of pixel coordinates that lie within the determined pixel boundaries of the object(s) in the scene external to the taxiing aircraft.

Some embodiments relate to a method for providing docking guidance to a pilot of a taxiing aircraft. The method includes generating, by a camera mounted at a camera location on an aircraft, a two-dimensional image of a scene external to the taxiing aircraft. The generated two-dimensional image includes pixel data generated by the two-dimensional array of light-sensitive pixels. The method includes identifying first and second sets of pixel coordinates within the image of the scene external to the aircraft. The identified first and second sets of pixel coordinates correspond to two vertically-separated and two laterally-separated indicia, respectively, of an alignment fiducial indicating a parking location for the aircraft. The method includes calculating, based at least in part on the identified first pixel coordinates corresponding to the two vertically-separated indicia, a range to the parking location. The method also includes generating a visual display of the image of the scene aligned with the optical axis of the camera. The visual display is annotated with the calculated range to the parking location.

The method of the preceding paragraph can optionally include, additionally and/or alternatively, any one or more of the following features, configurations and/or additional components:

A further embodiment of the foregoing method can further include calculating, based at least in part on the identified second pixel coordinates corresponding to the two laterally-separated indicia, an angle of the taxiing aircraft with respect to a normal vector of the alignment fiducial.

A further embodiment of any of the foregoing methods can further include calculating, based at least in part on the identified second pixel coordinates corresponding to the two laterally-separated indicia, a lateral translation of the longitudinal axis of the taxiing aircraft with respect to the parking location identified by the alignment fiducial.

A further embodiment of any of the foregoing methods can further include projecting, from a projector location on the taxiing aircraft, light of a spatial pattern onto the scene external to the aircraft, thereby illuminating a spatially-patterned portion of the scene.

A further embodiment of any of the foregoing methods can further include identifying a third set of pixel coordinates within the image of the scene external to the aircraft, the identified third set of pixel coordinates corresponding to the spatially-patterned portion of the scene.

A further embodiment of any of the foregoing methods can further include calculating, using triangulation based on the projector location of the light projector, the camera location of the camera and the identified third set of pixel coordinates, location(s) and/or range(s) of object(s) in the scene external to the aircraft from which the spatially-patterned light projected by the light projector is reflected.

A further embodiment of any of the foregoing methods can further include generating a visual display of the image external to the taxiing aircraft, the visual display annotated with the calculated location(s) and/or range(s) of object(s) in the scene external to the aircraft.

A further embodiment of any of the foregoing methods can further include activating an audible alarm when the calculated location(s) and/or range(s) of object(s) indicate one or more of the object(s) in the scene has a combination of a location(s) and/or range(s) corresponding to a risk of collision relative to the taxiing aircraft.

A further embodiment of any of the foregoing methods can further include determining pixel boundaries of the object(s) in the scene.

A further embodiment of any of the foregoing methods can further include calculating location(s) and/or range(s) of object(s) corresponding to the determined pixel boundaries.

A further embodiment of any of the foregoing methods can further include identifying a fourth set of pixel coordinates that lie within the determined pixel boundaries of the object(s) in the scene but are not included in the identified third set of pixel coordinates.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for providing docking guidance to a pilot of a taxiing aircraft, the system comprising:
   a camera configured for mounting at a camera location on the taxiing aircraft, the camera configured to generate a two-dimensional image of a scene external to the taxiing aircraft, the generated two-dimensional image comprising pixel data generated by the two-dimensional array of light-sensitive pixels; and
   a digital processor configured to identify first and second sets of pixel coordinates within the generated two-dimensional image of the scene external to the taxiing aircraft, the identified first and second sets of pixel coordinates corresponding to two vertically-separated and two laterally-separated indicia, respectively, of an alignment fiducial indicating a parking location for the taxiing aircraft, the digital processor further configured to calculate, based at least in part on the identified first pixel coordinates corresponding to the two vertically-separated indicia, a range to the parking location indicated by the alignment fiducial.

2. The system of claim 1, further comprising a cockpit alarm and display module configured to provide a visual display of the generated image of the scene aligned with the optical axis of the camera, the provided visual display annotated with the calculated range to the parking location.

3. The system of claim 1, wherein the digital processor is further configured to calculate, based at least in part on the identified second pixel coordinates corresponding to the two laterally-separated indicia, an angle of the taxiing aircraft with respect to a normal vector of the alignment fiducial.

4. The system of claim 1, wherein the digital processor is further configured to calculate, based at least in part on the identified second pixel coordinates corresponding to the two laterally-separated indicia, a lateral translation of the longitudinal axis of the taxiing aircraft with respect to the parking location identified by the alignment fiducial.

5. The system of claim 1, further comprising:
   a light projector configured to be mounted at a projector location on the taxiing aircraft and to project spatially-patterned light from the light projector onto the scene external to the taxiing aircraft, thereby providing illumination of a spatially-patterned portion of the scene external to the taxiing aircraft, wherein the digital processor is further configured to identify a third set of pixel coordinates within the image of the scene external to the taxiing aircraft, the identified third set of pixel coordinates corresponding to the spatially-patterned portion of the scene, the digital processor further configured to use triangulation, based on the projector location of the light projector, the camera location of the camera and the identified third set of pixel coordinates, to calculate location(s) and/or range(s) of object(s) in the scene external to the taxiing aircraft from which the spatially-patterned light projected by the light projector is reflected.

6. The system of claim 5, wherein the spatially-patterned light projected by the light projector comprises infrared light.

7. The system of claim 6, wherein the camera is an infrared camera and the light-sensitive pixels are sensitive to infrared light.

8. The system of claim 5, further comprising a cockpit alarm and display module configured to generate a visual display of the image aligned with the optical axis of the camera annotated with the calculated location(s) and/or range(s) of object(s) in the scene external to the taxiing aircraft.

9. The system of claim 8, wherein the cockpit alarm and display module includes an audible alarm that is activated when the calculated location(s) and/or range(s) indicate one or more of the object(s) in the scene has a combination of an location(s) and/or range(s) corresponding to a risk of collision relative to the taxiing aircraft.

10. The system of claim 5, wherein the digital processor is further configured to determine pixel boundaries of the object(s) in the scene.

11. The system of claim 10, wherein the digital processor is further configured to identify a fourth set of pixel coordinates that lie within the determined pixel boundaries of the object(s) in the scene external to the taxiing aircraft.

12. A method for providing docking guidance to a pilot of a taxiing aircraft, the method comprising:

generating, by a camera mounted at a camera location on an aircraft, a two-dimensional image of a scene external to the taxiing aircraft, the generated two-dimensional image comprising pixel data generated by the two-dimensional array of light-sensitive pixels;

identifying first and second sets of pixel coordinates within the image of the scene external to the aircraft, the identified first and second sets of pixel coordinates corresponding to two vertically-separated and two laterally-separated indicia, respectively, of an alignment fiducial indicating a parking location for the aircraft;

calculating, based at least in part on the identified first pixel coordinates corresponding to the two vertically-separated indicia, a range to the parking location; and generating a visual display of the image of the scene aligned with the optical axis of the camera, the visual display annotated with the calculated range to the parking location.

13. The method of claim 12, further comprising:
calculating, based at least in part on the identified second pixel coordinates corresponding to the two laterally-separated indicia, an angle of the taxiing aircraft with respect to a normal vector of the alignment fiducial.

14. The method of claim 13, further comprising:
calculating, based at least in part on the identified second pixel coordinates corresponding to the two laterally-separated indicia, a lateral translation of the longitudinal axis of the taxiing aircraft with respect to the parking location identified by the alignment fiducial.

15. The method of claim 13, further comprising:
projecting, from a projector location on the taxiing aircraft, light of a spatial pattern onto the scene external to the aircraft, thereby illuminating a spatially-patterned portion of the scene;

identifying a third set of pixel coordinates within the image of the scene external to the aircraft, the identified third set of pixel coordinates corresponding to the spatially-patterned portion of the scene; and calculating, using triangulation based on the projector location of the light projector, the camera location of the camera and the identified third set of pixel coordinates, location(s) and/or range(s) of object(s) in the scene external to the aircraft from which the spatially-patterned light projected by the light projector is reflected.

16. The method of claim 15, further comprising:
generating a visual display of the image external to the taxiing aircraft, the visual display annotated with the calculated location(s) and/or range(s) of object(s) in the scene external to the aircraft.

17. The method of claim 16, further comprising:
activating an audible alarm when the calculated location(s) and/or range(s) of object(s) indicate one or more of the object(s) in the scene has a combination of a location(s) and/or range(s) corresponding to a risk of collision relative to the taxiing aircraft.

18. The method of claim 16, further comprising:
determining pixel boundaries of the object(s) in the scene.

19. The method of claim 18, further comprising:
calculating location(s) and/or range(s) of object(s) corresponding to the determined pixel boundaries.

20. The method of claim 18, further comprising:
identifying a fourth set of pixel coordinates that lie within the determined pixel boundaries of the object(s) in the scene but are not included in the identified third set of pixel coordinates.

* * * * *